(12) United States Patent
Chen et al.

(10) Patent No.: US 11,943,468 B2
(45) Date of Patent: Mar. 26, 2024

(54) METHODS AND APPARATUS OF VIDEO CODING USING PREDICTION REFINEMENT WITH OPTICAL FLOW

(71) Applicant: BEIJING DAJIA INTERNET INFORMATION TECHNOLOGY CO., LTD., Beijing (CN)

(72) Inventors: Yi-Wen Chen, Beijing (CN); Xiaoyu Xiu, Beijing (CN); Tsung-Chuan Ma, Beijing (CN); Hong-Jheng Jhu, Beijing (CN); Shuiming Ye, Beijing (CN); Xianglin Wang, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 220 days.

(21) Appl. No.: 17/527,024

(22) Filed: Nov. 15, 2021

(65) Prior Publication Data

US 2022/0078478 A1   Mar. 10, 2022

Related U.S. Application Data

(63) Continuation of application No. PCT/US2020/028655, filed on Apr. 17, 2020.
(Continued)

(51) Int. Cl.
*H04N 19/52* (2014.01)
*H04N 19/176* (2014.01)
(Continued)

(52) U.S. Cl.
CPC ........... *H04N 19/52* (2014.11); *H04N 19/176* (2014.11); *H04N 19/182* (2014.11); *H04N 19/577* (2014.11); *H04N 19/80* (2014.11)

(58) Field of Classification Search
None
See application file for complete search history.

(56) References Cited

U.S. PATENT DOCUMENTS

2018/0098063 A1    4/2018   Chen et al.
2018/0192069 A1    7/2018   Chen et al.
(Continued)

FOREIGN PATENT DOCUMENTS

WO    WO2020247577 A1    10/2020

OTHER PUBLICATIONS

Luo et al., "CE2-related: Prediction refinement with optical flow for affine mode," Joint Video Experts Team (JVET) of ITU-T SG 16 WP 3 and ISO/IEC JTC 1/SC 29/WG 11 14th Meeting: Geneva, CH, Mar. 19-27, 2019, JVET-N0236-r5.*
(Continued)

*Primary Examiner* — Edemio Navas, Jr.
(74) *Attorney, Agent, or Firm* — Scully, Scott, Murphy & Presser, P.C.

(57) ABSTRACT

An electronic apparatus performs a method of updating an inter-predicted current block using a neighboring affine block. The electronic apparatus first identifies a pixel within the inter-predicted current block, the pixel having a first inter-predicted pixel value. Next, the electronic apparatus determines a motion vector difference for the pixel based on a set of affine parameters of the neighboring affine block and then a pixel value difference for the pixel according to the motion vector difference. The pixel value difference is an inner product of the pixel value gradient vector and the motion vector difference as the pixel value difference. Finally, the electronic apparatus updates the first inter-predicted pixel value with the pixel value difference as a second inter-predicted pixel value.

18 Claims, 9 Drawing Sheets

Related U.S. Application Data

(60) Provisional application No. 62/836,599, filed on Apr. 19, 2019.

(51) Int. Cl.
*H04N 19/182* (2014.01)
*H04N 19/577* (2014.01)
*H04N 19/80* (2014.01)

(56) References Cited

U.S. PATENT DOCUMENTS

| | | | |
|---|---|---|---|
| 2019/0082191 | A1 | 3/2019 | Chuang et al. |
| 2019/0116376 | A1 | 4/2019 | Chen et al. |
| 2019/0327482 | A1* | 10/2019 | Lin .................. H04N 19/52 |
| 2020/0404256 | A1* | 12/2020 | Zhang ............... H04N 19/52 |
| 2021/0211679 | A1* | 7/2021 | Zhang .............. H04N 19/105 |
| 2021/0329229 | A1* | 10/2021 | Chen ................ H04N 19/463 |
| 2022/0070448 | A1* | 3/2022 | Kim .................. H04N 19/54 |

OTHER PUBLICATIONS

Chen et al., "Algorithm description for Versatile Video Coding and Test Model 4 (VTM 4)", Joint Video Experts Team (JVET) of ITU-T SG 16 WP 3 and ISO/IEC JTC 1/SC 29/WG 11, 13th Meeting: Marrakech, MA, Jan. 9-18, 2019, JVET-M1002-v2.*

Beijing Dajia Internet Information Technology Co. Ltd., EP20791062.1, Extended European Search Report, dated Dec. 8, 2022, 15 pgs.

Xiaoyu Xiu et al., "CE4-related: Harmonization of BDOF and PROF", Document: JVET-O0593, Joint Video Experts Team (JVET) of ITU-T SG 16 WP 3 and ISO/IEC JTC 1/SC 29/WG 11, 15th Meeting: Gothenburg, SE, Jul. 3-12, 2019, 5 pgs.

Jianle Chen et al., "Algorithm description for Versatile Video Coding and Test Mode 4 (VTM 4)", Document: JVET-M1002-v2, Joint Video Experts Team (JVET) of ITU-T SG 16 WP 3 and ISO/IEC JTC 1/SC 29/WG 11, 13th Meeting: Marrakech, MA, Jan. 9-18, 2019, 62 pgs.

Haitao Yang et al., "Description of Core Experiment 4 (CE4): Inter Prediction", Document: JVET-N1024-v2, Joint Video Experts Team (JVET) of ITU-T SG 16 WP 3 and ISO/IEC JTC 1/SC 29/WG 11, 14th Meeting: Geneva, CH, Mar. 19-27, 2019, 11 pgs.

Chun-Chi Chen et al., "BoG report on CE2 sub-block based motion prediction related contributions", Document: JVET-N0776-v4, Joint Video Experts Team (JVET) of ITU-T SG 16 WP 3 and ISO/IEC JTC 1/SC 29/WG 11, 14th Meeting: Geneva, CH, Mar. 19-27, 2019, 12 pgs.

Han Huang et al., "CE2-related: Simplified prediction refinement for affine motion compensation", Document: JVET-N0504, Joint Video Experts Team (JVET) of ITU-T SG 16 WP 3 and ISO/IEC JTC 1/SC 29/WG 11, 14th Meeting: Geneva, CH, Mar. 19-27, 2019, 3 pgs.

Xiang Li et al., "Non-CE2: Combination of affine MV clip and prediction refinement with optical flow", Document: JVET-N0737_r1, Joint Video Experts Team (JVET) of ITU-T SG 16 WP 3 and ISO/IEC JTC 1/SC 29/WG 11, 14th Meeting: Geneva, CH, Mar. 19-27, 2019, 3 pgs.

Beijing Dajia Internet Information Technology Co. Ltd et al., International Search Report and Written Opinion, PCT/US2020/028655, dated Jul. 27, 2020, 8 pgs.

Jiancong (Daniel) Luo, CE2-related: Prediction refinement with optical flow for a affine mode, Joint Video Experts Team (JVET) of ITU-T-SG 16 WP 3 and ISO/IEC JTC 1/SC 29/WG 11, Document: JVET-N02365, 14th Meeting: Geneva, CH, Mar. 19-27, 2019, 8 pgs.

* cited by examiner

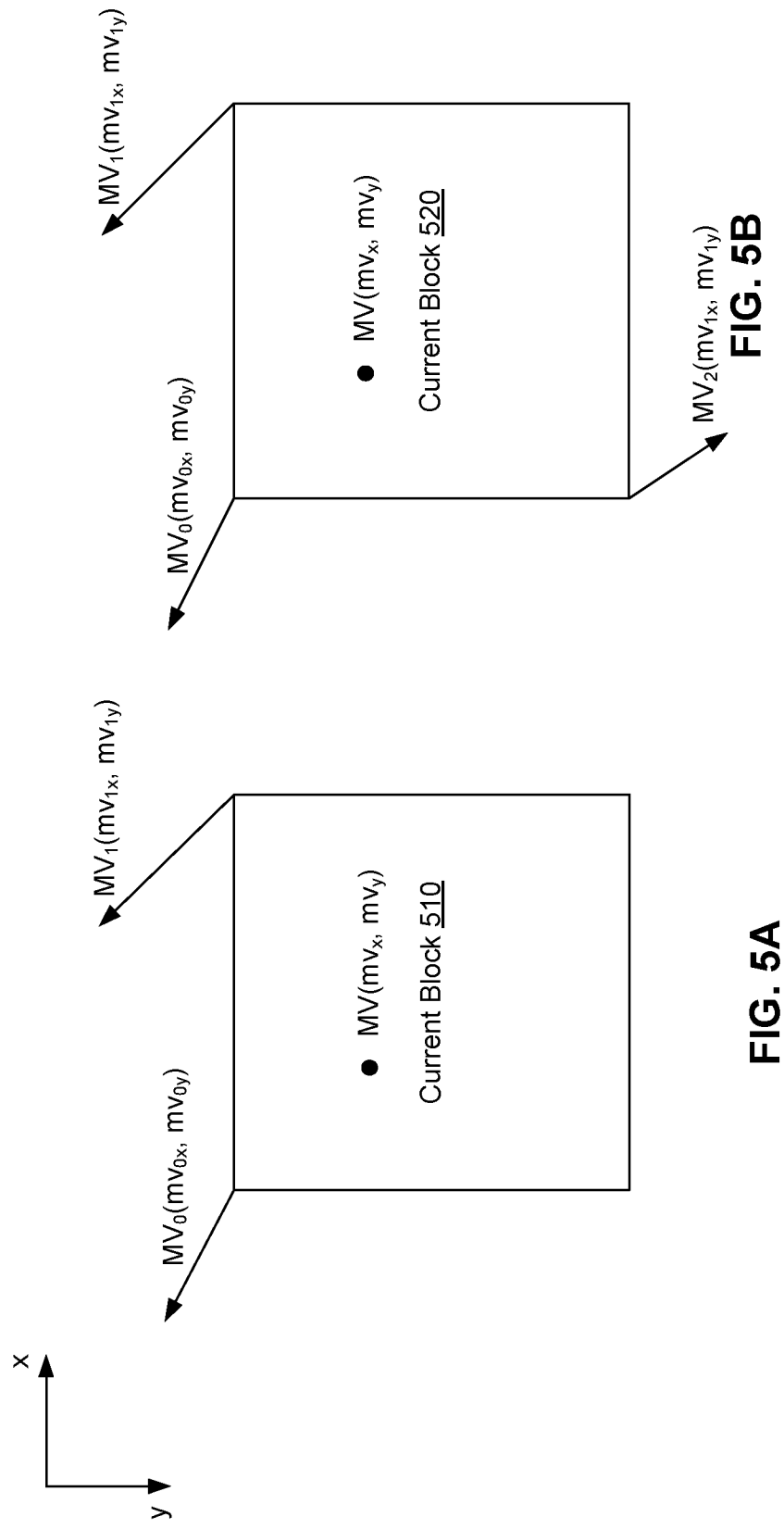

600

```
identifying a pixel within the inter-predicted current block, the pixel having
a first inter-predicted pixel value 610
                    ↓
determining a motion vector difference for the pixel based on a set of
affine parameters of the neighboring affine block 630
                    ↓
determining a pixel value difference for the pixel according to the motion
vector difference 650
   ┌─────────────────────────────────────────────────────────┐
   │ determining a pixel value gradient vector for the pixel 650-1 │
   └─────────────────────────────────────────────────────────┘
                    ↓
   ┌─────────────────────────────────────────────────────────┐
   │ calculating an inner product of the pixel value gradient vector and
     the motion vector difference as the pixel value difference 650-3 │
   └─────────────────────────────────────────────────────────┘
                    ↓
updating the first inter-predicted pixel value with the pixel value
difference as a second inter-predicted pixel value 670
   ┌─────────────────────────────────────────────────────────┐
   │ weighting the pixel value difference by a weighting factor 670-1 │
   └─────────────────────────────────────────────────────────┘
                    ↓
   ┌─────────────────────────────────────────────────────────┐
   │ adding the weighted pixel value difference to the first inter-
     predicted pixel value as the second inter-predicted pixel value
     670-3 │
   └─────────────────────────────────────────────────────────┘
```

FIG. 6

METHODS AND APPARATUS OF VIDEO CODING USING PREDICTION REFINEMENT WITH OPTICAL FLOW

CROSS-REFERENCE TO RELATED APPLICATIONS

This application is a continuation of PCT application No. PCT/US2020/028655, entitled "METHODS AND APPARATUS OF VIDEO CODING USING PREDICTION REFINEMENT WITH OPTICAL FLOW" filed on Apr. 17, 2020, which claims the benefit of U.S. Provisional Application No. 62/836,599, entitled "PREDICTION REFINEMENT WITH OPTICAL FLOW USING AFFINE MOTION MODEL" filed on Apr. 19, 2019, the entire disclosure of both of which is incorporated herein by reference.

TECHNICAL FIELD

The present application generally relates to video data encoding and decoding, and in particular, to method and system of video coding using prediction refinement with optical flow.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit, receive, encode, decode, and/or store digital video data by implementing video compression/decompression standards as defined by MPEG-4, ITU-T H.263, ITU-T H.264/MPEG-4, Part 10, Advanced Video Coding (AVC), High Efficiency Video Coding (HEVC), and Versatile Video Coding (VVC) standard. Video compression typically includes performing spatial (intra frame) prediction and/or temporal (inter frame) prediction to reduce or remove redundancy inherent in the video data. For block-based video coding, a video frame is partitioned into one or more slices, each slice having multiple video blocks, which may also be referred to as coding tree units (CTUs). Each CTU may contain one coding unit (CU) or recursively split into smaller CUs until the predefined minimum CU size is reached. Each CU (also named leaf CU) contains one or multiple transform units (TUs) and each CU also contains one or multiple prediction units (PUs). Each CU can be coded in either intra, inter or IBC modes. Video blocks in an intra coded (I) slice of a video frame are encoded using spatial prediction with respect to reference samples in neighboring blocks within the same video frame. Video blocks in an inter coded (P or B) slice of a video frame may use spatial prediction with respect to reference samples in neighboring blocks within the same video frame or temporal prediction with respect to reference samples in other previous and/or future reference video frames.

Spatial or temporal prediction based on a reference block that has been previously encoded, e.g., a neighboring block, results in a predictive block for a current video block to be coded. The process of finding the reference block may be accomplished by block matching algorithm. Residual data representing pixel differences between the current block to be coded and the predictive block is referred to as a residual block or prediction errors. An inter-coded block is encoded according to a motion vector that points to a reference block in a reference frame forming the predictive block, and the residual block. The process of determining the motion vector is typically referred to as motion estimation. An intra coded block is encoded according to an intra prediction mode and the residual block. For further compression, the residual block is transformed from the pixel domain to a transform domain, e.g., frequency domain, resulting in residual transform coefficients, which may then be quantized. The quantized transform coefficients, initially arranged in a two-dimensional array, may be scanned to produce a one-dimensional vector of transform coefficients, and then entropy encoded into a video bitstream to achieve even more compression.

The encoded video bitstream is then saved in a computer-readable storage medium (e.g., flash memory) to be accessed by another electronic device with digital video capability or directly transmitted to the electronic device wired or wirelessly. The electronic device then performs video decompression (which is an opposite process to the video compression described above) by, e.g., parsing the encoded video bitstream to obtain syntax elements from the bitstream and reconstructing the digital video data to its original format from the encoded video bitstream based at least in part on the syntax elements obtained from the bitstream, and renders the reconstructed digital video data on a display of the electronic device.

SUMMARY

The present application describes implementations related to video data encoding and decoding and, more particularly, to system and method of video coding using prediction refinement with optical flow.

According to a first aspect of the present application, a method of updating an inter-predicted current block using a neighboring affine block is performed at an electronic apparatus, the method including: identifying a pixel within the inter-predicted current block, the pixel having a first inter-predicted pixel value; determining a motion vector difference for the pixel based on a set of affine parameters of the neighboring affine block; determining a pixel value difference for the pixel according to the motion vector difference; and updating the first inter-predicted pixel value with the pixel value difference as a second inter-predicted pixel value.

According to a second aspect of the present application, an electronic apparatus includes one or more processing units, memory and a plurality of programs stored in the memory. The programs, when executed by the one or more processing units, cause the electronic apparatus to perform the method of updating an inter-predicted current block using a neighboring affine block as described above.

According to a third aspect of the present application, a non-transitory computer readable storage medium stores a plurality of programs for execution by an electronic apparatus having one or more processing units. The programs, when executed by the one or more processing units, cause the electronic apparatus to perform the method of updating an inter-predicted current block using a neighboring affine block as described above.

BRIEF DESCRIPTION OF DRAWINGS

The accompanying drawings, which are included to provide a further understanding of the implementations and are incorporated herein and constitute a part of the specification, illustrate the described implementations and together with the description serve to explain the underlying principles. Like reference numerals refer to corresponding parts.

FIGS. 5A and 5B are block diagrams illustrating a 4-parameter block-based affine motion model and a 6-parameter block-based affine motion model, respectively, in accordance with some implementations of the present disclosure.

FIG. 6 is a flowchart illustrating a process of refining a prediction for a sub-block within an inter-predicted current block using a neighboring affine block in accordance with some implementations of the present disclosure.

DETAILED DESCRIPTION

Reference will now be made in detail to specific implementations, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used without departing from the scope of claims and the subject matter may be practiced without these specific details. For example, it will be apparent to one of ordinary skill in the art that the subject matter presented herein can be implemented on many types of electronic devices with digital video capabilities.

Figure 1:
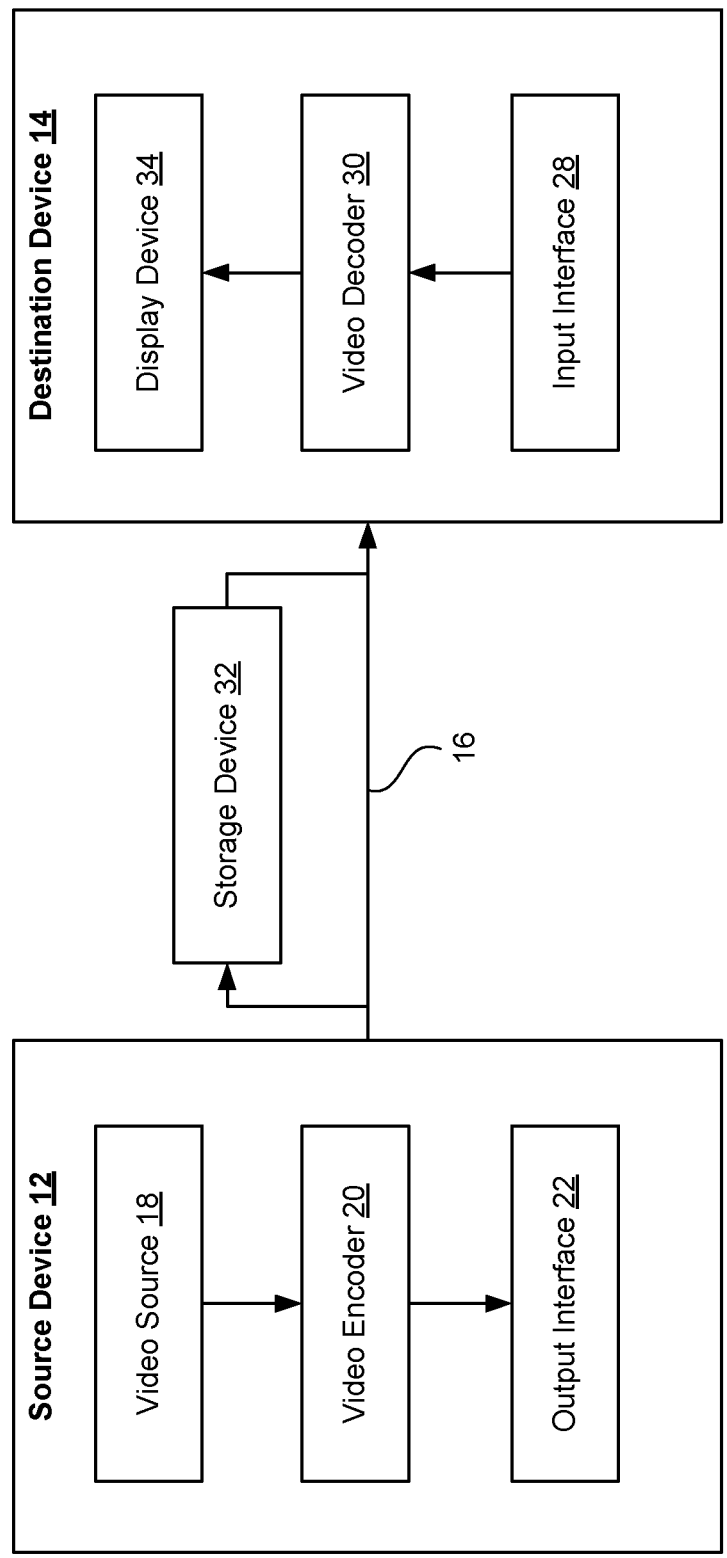
FIG. 1 is a block diagram illustrating an exemplary video encoding and decoding system in accordance with some implementations of the present disclosure.

FIG. 1 is a block diagram illustrating an exemplary system 10 for encoding and decoding video blocks in parallel in accordance with some implementations of the present disclosure. As shown in FIG. 1, system 10 includes a source device 12 that generates and encodes video data to be decoded at a later time by a destination device 14. Source device 12 and destination device 14 may comprise any of a wide variety of electronic devices, including desktop or laptop computers, tablet computers, smart phones, set-top boxes, digital televisions, cameras, display devices, digital media players, video gaming consoles, video streaming device, or the like. In some implementations, source device 12 and destination device 14 are equipped with wireless communication capabilities.

In some implementations, destination device 14 may receive the encoded video data to be decoded via a link 16. Link 16 may comprise any type of communication medium or device capable of moving the encoded video data from source device 12 to destination device 14. In one example, link 16 may comprise a communication medium to enable source device 12 to transmit the encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some other implementations, the encoded video data may be transmitted from output interface 22 to a storage device 32. Subsequently, the encoded video data in storage device 32 may be accessed by destination device 14 via input interface 28. Storage device 32 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 32 may correspond to a file server or another intermediate storage device that may hold the encoded video data generated by source device 12. Destination device 14 may access the stored video data from storage device 32 via streaming or downloading. The file server may be any type of computer capable of storing encoded video data and transmitting the encoded video data to destination device 14. Exemplary file servers include a web server (e.g., for a website), an FTP server, network attached storage (NAS) devices, or a local disk drive. Destination device 14 may access the encoded video data through any standard data connection, including a wireless channel (e.g., a Wi-Fi connection), a wired connection (e.g., DSL, cable modem, etc.), or a combination of both that is suitable for accessing encoded video data stored on a file server. The transmission of encoded video data from storage device 32 may be a streaming transmission, a download transmission, or a combination of both.

As shown in FIG. 1, source device 12 includes a video source 18, a video encoder 20 and an output interface 22. Video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera of a security surveillance system, source device 12 and destination device 14 may form camera phones or video phones. However, the implementations described in the present application may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 32 for later access by destination device 14 or other devices, for decoding and/or playback. Output interface 22 may further include a modem and/or a transmitter.

Destination device 14 includes an input interface 28, a video decoder 30, and a display device 34. Input interface 28 may include a receiver and/or a modem and receive the encoded video data over link 16. The encoded video data communicated over link 16, or provided on storage device 32, may include a variety of syntax elements generated by video encoder 20 for use by video decoder 30 in decoding the video data. Such syntax elements may be included within the encoded video data transmitted on a communication medium, stored on a storage medium, or stored a file server.

In some implementations, destination device 14 may include a display device 34, which can be an integrated display device and an external display device that is configured to communicate with destination device 14. Display device 34 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to proprietary or industry standards, such as VVC, HEVC, MPEG-4, Part 10, Advanced Video Coding (AVC), or extensions of such standards. It should be understood that the present application is not limited to a specific video coding/decoding standard and may be applicable to other video coding/decoding standards. It is generally contemplated that video encoder 20 of source device 12 may be configured to encode video data according to any of these current or future standards. Similarly, it is also generally contemplated that video decoder 30 of destination device 14 may be configured to decode video data according to any of these current or future standards.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When implemented partially in software, an electronic device may store instructions for the software in a suitable, non-transitory computer-readable medium and execute the instructions in hardware using one or more processors to perform the video coding/decoding operations disclosed in the present disclosure. Each of video encoder 20 and video decoder 30 may be included in one or more encoders or decoders, either of which may be integrated as part of a combined encoder/decoder (CODEC) in a respective device.

Figure 2:
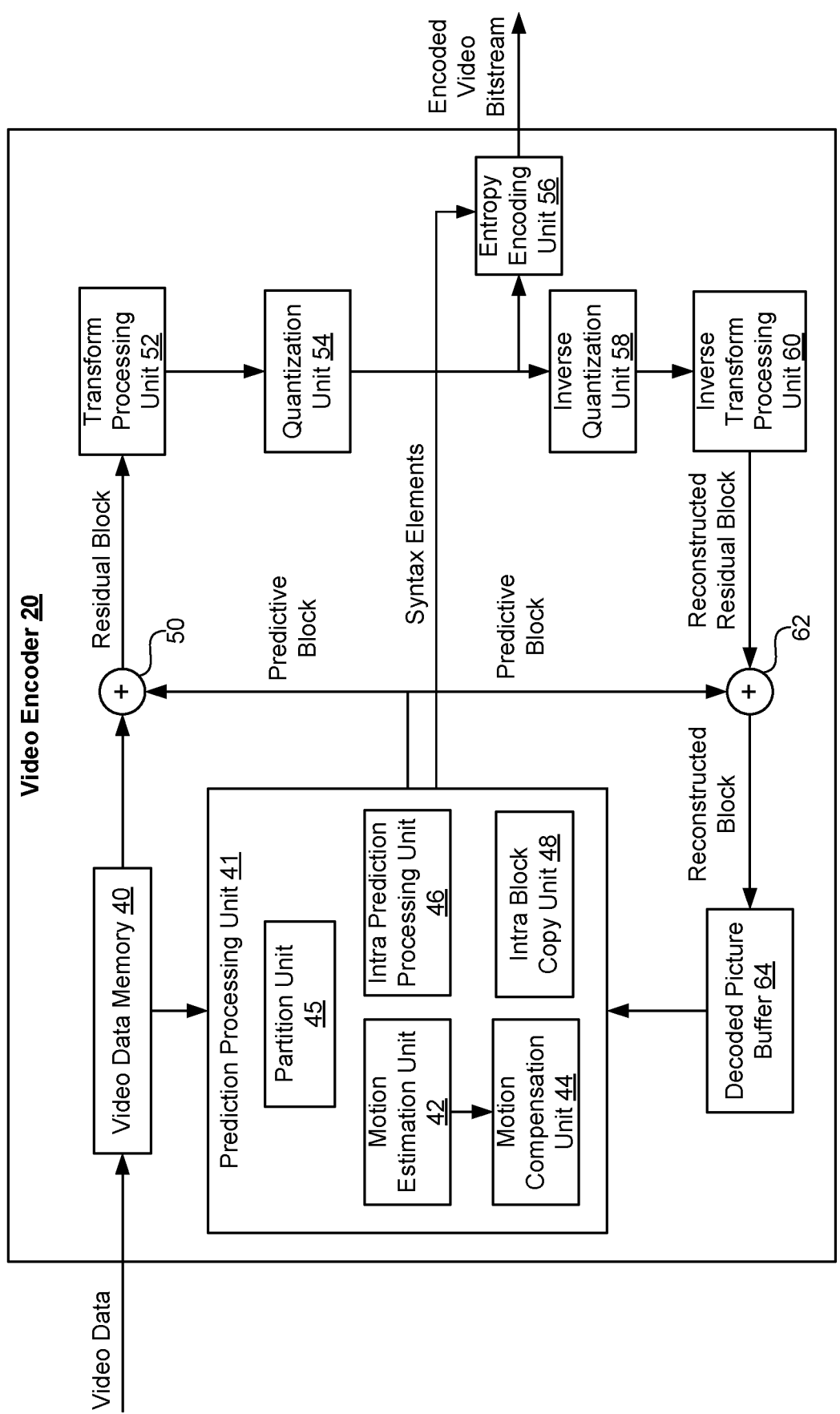
FIG. 2 is a block diagram illustrating an exemplary video encoder in accordance with some implementations of the present disclosure.

FIG. 2 is a block diagram illustrating an exemplary video encoder 20 in accordance with some implementations described in the present application. Video encoder 20 may perform intra and inter predictive coding of video blocks within video frames. Intra predictive coding relies on spatial prediction to reduce or remove spatial redundancy in video data within a given video frame or picture. Inter predictive coding relies on temporal prediction to reduce or remove temporal redundancy in video data within adjacent video frames or pictures of a video sequence.

As shown in FIG. 2, video encoder 20 includes video data memory 40, prediction processing unit 41, decoded picture buffer (DPB) 64, summer 50, transform processing unit 52, quantization unit 54, and entropy encoding unit 56. Prediction processing unit 41 further includes motion estimation unit 42, motion compensation unit 44, partition unit 45, intra prediction processing unit 46, and intra block copy (BC) unit 48. In some implementations, video encoder 20 also includes inverse quantization unit 58, inverse transform processing unit 60, and summer 62 for video block reconstruction. A deblocking filter (not shown) may be positioned between summer 62 and DPB 64 to filter block boundaries to remove blockiness artifacts from reconstructed video. An in loop filter (not shown) may also be used in addition to the deblocking filter to filter the output of summer 62. Video encoder 20 may take the form of a fixed or programmable hardware unit or may be divided among one or more of the illustrated fixed or programmable hardware units.

Video data memory 40 may store video data to be encoded by the components of video encoder 20. The video data in video data memory 40 may be obtained, for example, from video source 18. DPB 64 is a buffer that stores reference video data for use in encoding video data by video encoder 20 (e.g., in intra or inter predictive coding modes). Video data memory 40 and DPB 64 may be formed by any of a variety of memory devices. In various examples, video data memory 40 may be on-chip with other components of video encoder 20, or off-chip relative to those components.

As shown in FIG. 2, after receiving video data, partition unit 45 within prediction processing unit 41 partitions the video data into video blocks. This partitioning may also include partitioning a video frame into slices, tiles, or other larger coding units (CUs) according to a predefined splitting structures such as quad-tree structure associated with the video data. The video frame may be divided into multiple video blocks (or sets of video blocks referred to as tiles). Prediction processing unit 41 may select one of a plurality of possible predictive coding modes, such as one of a plurality of intra predictive coding modes or one of a plurality of inter predictive coding modes, for the current video block based on error results (e.g., coding rate and the level of distortion). Prediction processing unit 41 may provide the resulting intra or inter prediction coded block to summer 50 to generate a residual block and to summer 62 to reconstruct the encoded block for use as part of a reference frame subsequently. Prediction processing unit 41 also provides syntax elements, such as motion vectors, intra-mode indicators, partition information, and other such syntax information, to entropy encoding unit 56.

In order to select an appropriate intra predictive coding mode for the current video block, intra prediction processing unit 46 within prediction processing unit 41 may perform intra predictive coding of the current video block relative to one or more neighboring blocks in the same frame as the current block to be coded to provide spatial prediction. Motion estimation unit 42 and motion compensation unit 44 within prediction processing unit 41 perform inter predictive coding of the current video block relative to one or more predictive blocks in one or more reference frames to provide temporal prediction. Video encoder 20 may perform multiple coding passes, e.g., to select an appropriate coding mode for each block of video data.

In some implementations, motion estimation unit 42 determines the inter prediction mode for a current video frame by generating a motion vector, which indicates the displacement of a prediction unit (PU) of a video block within the current video frame relative to a predictive block within a reference video frame, according to a predetermined pattern within a sequence of video frames. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). The predetermined pattern may designate video frames in the sequence as P frames or B frames. Intra BC unit 48 may determine vectors, e.g., block vectors, for intra BC coding in a manner similar to the determination of motion vectors by motion estimation unit 42 for inter prediction, or may utilize motion estimation unit 42 to determine the block vector.

A predictive block is a block of a reference frame that is deemed as closely matching the PU of the video block to be coded in terms of pixel difference, which may be determined by sum of absolute difference (SAD), sum of square difference (SSD), or other difference metrics. In some implementations, video encoder 20 may calculate values for sub-integer pixel positions of reference frames stored in DPB 64. For example, video encoder 20 may interpolate values of one-quarter pixel positions, one-eighth pixel positions, or other fractional pixel positions of the reference frame. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter prediction coded frame by comparing the position of the PU to the position of a predictive block of a reference frame selected from a first reference frame list (List 0) or a second reference frame list (List 1), each of which identifies one or more reference frames stored in DPB 64. Motion estimation unit 42 sends the calculated motion vector to motion compensation unit 44 and then to entropy encoding unit 56.

Motion compensation, performed by motion compensation unit 44, may involve fetching or generating the predictive block based on the motion vector determined by motion estimation unit 42. Upon receiving the motion vector for the PU of the current video block, motion compensation unit 44 may locate a predictive block to which the motion vector points in one of the reference frame lists, retrieve the predictive block from DPB 64, and forward the predictive block to summer 50. Summer 50 then forms a residual video block of pixel difference values by subtracting pixel values of the predictive block provided by motion compensation unit 44 from the pixel values of the current video block being coded. The pixel difference values forming the residual vide block may include luma or chroma difference components or both. Motion compensation unit 44 may also generate syntax elements associated with the video blocks of a video frame for use by video decoder 30 in decoding the video blocks of the video frame. The syntax elements may include, for example, syntax elements defining the motion vector used to identify the predictive block, any flags indicating the prediction mode, or any other syntax information described herein. Note that motion estimation unit 42 and motion compensation unit 44 may be highly integrated, but are illustrated separately for conceptual purposes.

In some implementations, intra BC unit 48 may generate vectors and fetch predictive blocks in a manner similar to that described above in connection with motion estimation unit 42 and motion compensation unit 44, but with the predictive blocks being in the same frame as the current block being coded and with the vectors being referred to as block vectors as opposed to motion vectors. In particular, intra BC unit 48 may determine an intra-prediction mode to use to encode a current block. In some examples, intra BC unit 48 may encode a current block using various intra-prediction modes, e.g., during separate encoding passes, and test their performance through rate-distortion analysis. Next, intra BC unit 48 may select, among the various tested intra-prediction modes, an appropriate intra-prediction mode to use and generate an intra-mode indicator accordingly. For example, intra BC unit 48 may calculate rate-distortion values using a rate-distortion analysis for the various tested intra-prediction modes, and select the intra-prediction mode having the best rate-distortion characteristics among the tested modes as the appropriate intra-prediction mode to use. Rate-distortion analysis generally determines an amount of distortion (or error) between an encoded block and an original, unencoded block that was encoded to produce the encoded block, as well as a bitrate (i.e., a number of bits) used to produce the encoded block. Intra BC unit 48 may calculate ratios from the distortions and rates for the various encoded blocks to determine which intra-prediction mode exhibits the best rate-distortion value for the block.

In other examples, intra BC unit 48 may use motion estimation unit 42 and motion compensation unit 44, in whole or in part, to perform such functions for Intra BC prediction according to the implementations described herein. In either case, for Intra block copy, a predictive block may be a block that is deemed as closely matching the block to be coded, in terms of pixel difference, which may be determined by sum of absolute difference (SAD), sum of squared difference (SSD), or other difference metrics, and identification of the predictive block may include calculation of values for sub-integer pixel positions.

Whether the predictive block is from the same frame according to intra prediction, or a different frame according to inter prediction, video encoder 20 may form a residual video block by subtracting pixel values of the predictive block from the pixel values of the current video block being coded, forming pixel difference values. The pixel difference values forming the residual video block may include both luma and chroma component differences.

Intra prediction processing unit 46 may intra-predict a current video block, as an alternative to the inter-prediction performed by motion estimation unit 42 and motion compensation unit 44, or the intra block copy prediction performed by intra BC unit 48, as described above. In particular, intra prediction processing unit 46 may determine an intra prediction mode to use to encode a current block. To do so, intra prediction processing unit 46 may encode a current block using various intra prediction modes, e.g., during separate encoding passes, and intra prediction processing unit 46 (or a mode select unit, in some examples) may select an appropriate intra prediction mode to use from the tested intra prediction modes. Intra prediction processing unit 46 may provide information indicative of the selected intra-prediction mode for the block to entropy encoding unit 56. Entropy encoding unit 56 may encode the information indicating the selected intra-prediction mode in the bitstream.

After prediction processing unit 41 determines the predictive block for the current video block via either inter prediction or intra prediction, summer 50 forms a residual video block by subtracting the predictive block from the current video block. The residual video data in the residual block may be included in one or more transform units (TUs) and is provided to transform processing unit 52. Transform processing unit 52 transforms the residual video data into residual transform coefficients using a transform, such as a discrete cosine transform (DCT) or a conceptually similar transform.

Transform processing unit 52 may send the resulting transform coefficients to quantization unit 54. Quantization unit 54 quantizes the transform coefficients to further reduce bit rate. The quantization process may also reduce the bit depth associated with some or all of the coefficients. The degree of quantization may be modified by adjusting a quantization parameter. In some examples, quantization unit 54 may then perform a scan of a matrix including the quantized transform coefficients. Alternatively, entropy encoding unit 56 may perform the scan.

Following quantization, entropy encoding unit 56 entropy encodes the quantized transform coefficients into a video bitstream using, e.g., context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. The encoded bitstream may then be transmitted to video decoder 30, or archived in storage device 32 for later transmission to or retrieval by video decoder 30. Entropy encoding unit 56 may also entropy encode the motion vectors and the other syntax elements for the current video frame being coded.

Inverse quantization unit 58 and inverse transform processing unit 60 apply inverse quantization and inverse transformation, respectively, to reconstruct the residual video block in the pixel domain for generating a reference block for prediction of other video blocks. As noted above, motion compensation unit 44 may generate a motion compensated predictive block from one or more reference blocks of the frames stored in DPB 64. Motion compensation unit 44 may also apply one or more interpolation filters to the predictive block to calculate sub-integer pixel values for use in motion estimation.

Summer 62 adds the reconstructed residual block to the motion compensated predictive block produced by motion compensation unit 44 to produce a reference block for storage in DPB 64. The reference block may then be used by intra BC unit 48, motion estimation unit 42 and motion compensation unit 44 as a predictive block to inter predict another video block in a subsequent video frame.

Figure 3:
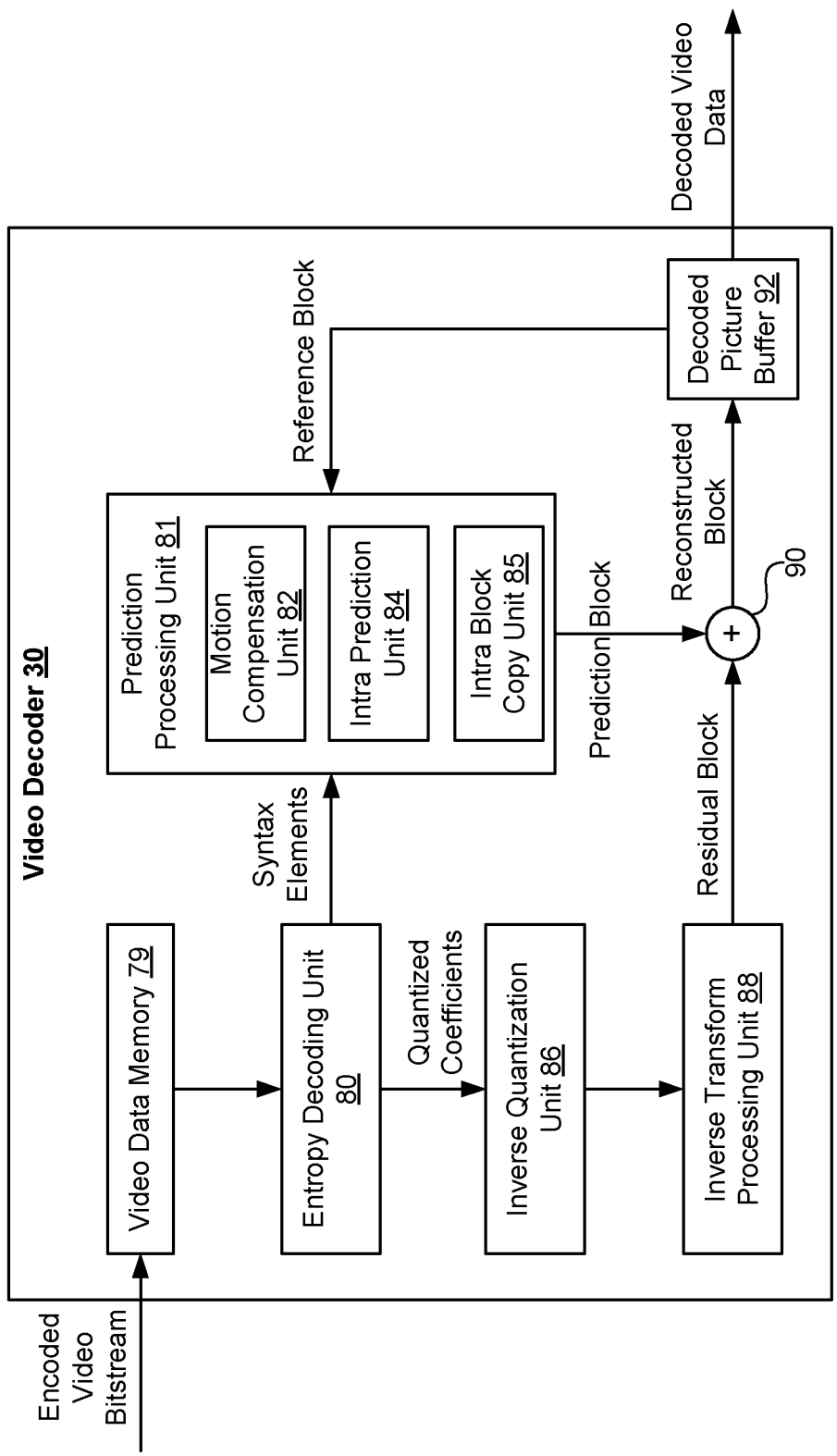
FIG. 3 is a block diagram illustrating an exemplary video decoder in accordance with some implementations of the present disclosure.

FIG. 3 is a block diagram illustrating an exemplary video decoder 30 in accordance with some implementations of the present application. Video decoder 30 includes video data memory 79, entropy decoding unit 80, prediction processing unit 81, inverse quantization unit 86, inverse transform processing unit 88, summer 90, and DPB 92. Prediction processing unit 81 further includes motion compensation unit 82, intra prediction unit 84, and intra BC unit 85. Video decoder 30 may perform a decoding process generally reciprocal to the encoding process described above with respect to video encoder 20 in connection with FIG. 2. For example, motion compensation unit 82 may generate prediction data based on motion vectors received from entropy decoding unit 80, while intra-prediction unit 84 may generate prediction data based on intra-prediction mode indicators received from entropy decoding unit 80.

In some examples, a unit of video decoder 30 may be tasked to perform the implementations of the present application. Also, in some examples, the implementations of the present disclosure may be divided among one or more of the units of video decoder 30. For example, intra BC unit 85 may perform the implementations of the present application, alone, or in combination with other units of video decoder 30, such as motion compensation unit 82, intra prediction unit 84, and entropy decoding unit 80. In some examples, video decoder 30 may not include intra BC unit 85 and the functionality of intra BC unit 85 may be performed by other components of prediction processing unit 81, such as motion compensation unit 82.

Video data memory 79 may store video data, such as an encoded video bitstream, to be decoded by the other components of video decoder 30. The video data stored in video data memory 79 may be obtained, for example, from storage device 32, from a local video source, such as a camera, via wired or wireless network communication of video data, or by accessing physical data storage media (e.g., a flash drive or hard disk). Video data memory 79 may include a coded picture buffer (CPB) that stores encoded video data from an encoded video bitstream. Decoded picture buffer (DPB) 92 of video decoder 30 stores reference video data for use in decoding video data by video decoder 30 (e.g., in intra or inter predictive coding modes). Video data memory 79 and DPB 92 may be formed by any of a variety of memory devices, such as dynamic random access memory (DRAM), including synchronous DRAM (SDRAM), magneto-resistive RAM (MRAM), resistive RAM (RRAM), or other types of memory devices. For illustrative purpose, video data memory 79 and DPB 92 are depicted as two distinct components of video decoder 30 in FIG. 3. But it will be apparent to one skilled in the art that video data memory 79 and DPB 92 may be provided by the same memory device or separate memory devices. In some examples, video data memory 79 may be on-chip with other components of video decoder 30, or off-chip relative to those components.

During the decoding process, video decoder 30 receives an encoded video bitstream that represents video blocks of an encoded video frame and associated syntax elements. Video decoder 30 may receive the syntax elements at the video frame level and/or the video block level. Entropy decoding unit 80 of video decoder 30 entropy decodes the bitstream to generate quantized coefficients, motion vectors or intra-prediction mode indicators, and other syntax elements. Entropy decoding unit 80 then forwards the motion vectors and other syntax elements to prediction processing unit 81.

When the video frame is coded as an intra predictive coded (I) frame or for intra coded predictive blocks in other types of frames, intra prediction unit 84 of prediction processing unit 81 may generate prediction data for a video block of the current video frame based on a signaled intra prediction mode and reference data from previously decoded blocks of the current frame.

When the video frame is coded as an inter-predictive coded (i.e., B or P) frame, motion compensation unit 82 of prediction processing unit 81 produces one or more predictive blocks for a video block of the current video frame based on the motion vectors and other syntax elements received from entropy decoding unit 80. Each of the predictive blocks may be produced from a reference frame within one of the reference frame lists. Video decoder 30 may construct the reference frame lists, List 0 and List 1, using default construction techniques based on reference frames stored in DPB 92.

In some examples, when the video block is coded according to the intra BC mode described herein, intra BC unit 85 of prediction processing unit 81 produces predictive blocks for the current video block based on block vectors and other syntax elements received from entropy decoding unit 80. The predictive blocks may be within a reconstructed region of the same picture as the current video block defined by video encoder 20.

Motion compensation unit 82 and/or intra BC unit 85 determines prediction information for a video block of the current video frame by parsing the motion vectors and other syntax elements, and then uses the prediction information to produce the predictive blocks for the current video block being decoded. For example, motion compensation unit 82 uses some of the received syntax elements to determine a prediction mode (e.g., intra or inter prediction) used to code video blocks of the video frame, an inter prediction frame type (e.g., B or P), construction information for one or more of the reference frame lists for the frame, motion vectors for each inter predictive encoded video block of the frame, inter prediction status for each inter predictive coded video block of the frame, and other information to decode the video blocks in the current video frame.

Similarly, intra BC unit 85 may use some of the received syntax elements, e.g., a flag, to determine that the current video block was predicted using the intra BC mode, construction information of which video blocks of the frame are within the reconstructed region and should be stored in DPB 92, block vectors for each intra BC predicted video block of the frame, intra BC prediction status for each intra BC predicted video block of the frame, and other information to decode the video blocks in the current video frame.

Motion compensation unit 82 may also perform interpolation using the interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks.

Inverse quantization unit 86 inverse quantizes the quantized transform coefficients provided in the bitstream and entropy decoded by entropy decoding unit 80 using the same quantization parameter calculated by video encoder 20 for each video block in the video frame to determine a degree of quantization. Inverse transform processing unit 88 applies an inverse transform, e.g., an inverse DCT, an inverse integer transform, or a conceptually similar inverse transform process, to the transform coefficients in order to reconstruct the residual blocks in the pixel domain.

After motion compensation unit 82 or intra BC unit 85 generates the predictive block for the current video block based on the vectors and other syntax elements, summer 90 reconstructs decoded video block for the current video block by summing the residual block from inverse transform processing unit 88 and a corresponding predictive block generated by motion compensation unit 82 and intra BC unit 85. An in-loop filter (not pictured) may be positioned between summer 90 and DPB 92 to further process the decoded video block. The decoded video blocks in a given frame are then stored in DPB 92, which stores reference frames used for subsequent motion compensation of next video blocks. DPB 92, or a memory device separate from DPB 92, may also store decoded video for later presentation on a display device, such as display device 34 of FIG. 1.

In a typical video coding process, a video sequence typically includes an ordered set of frames or pictures. Each frame may include three sample arrays, denoted SL, SCb, and SCr. SL is a two-dimensional array of luma samples. SCb is a two-dimensional array of Cb chroma samples. SCr is a two-dimensional array of Cr chroma samples. In other instances, a frame may be monochrome and therefore includes only one two-dimensional array of luma samples.

Figure 4A:
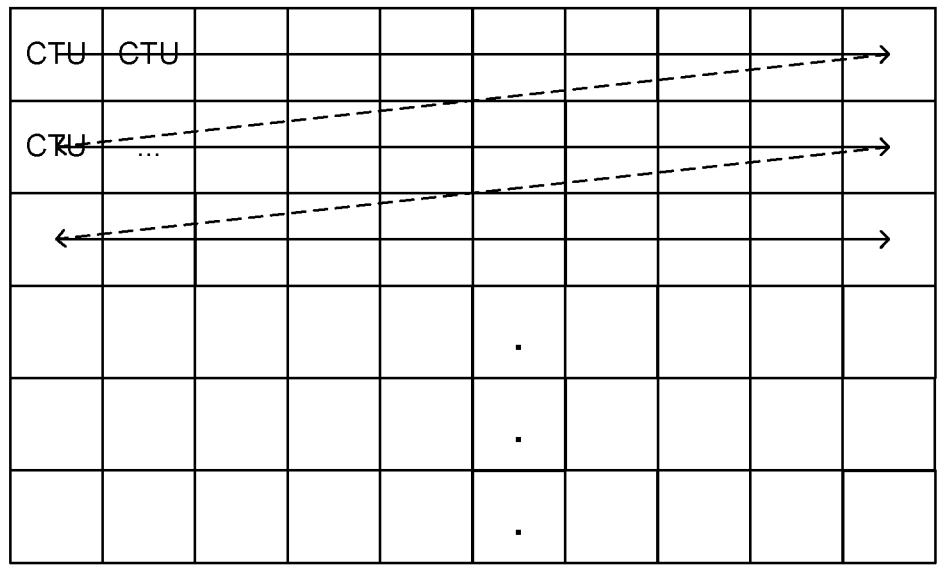
FIGS. 4A-4D are block diagrams illustrating how a frame is recursively quad-tree partitioned into multiple video blocks of different sizes in accordance with some implementations of the present disclosure.
Figure 4B:
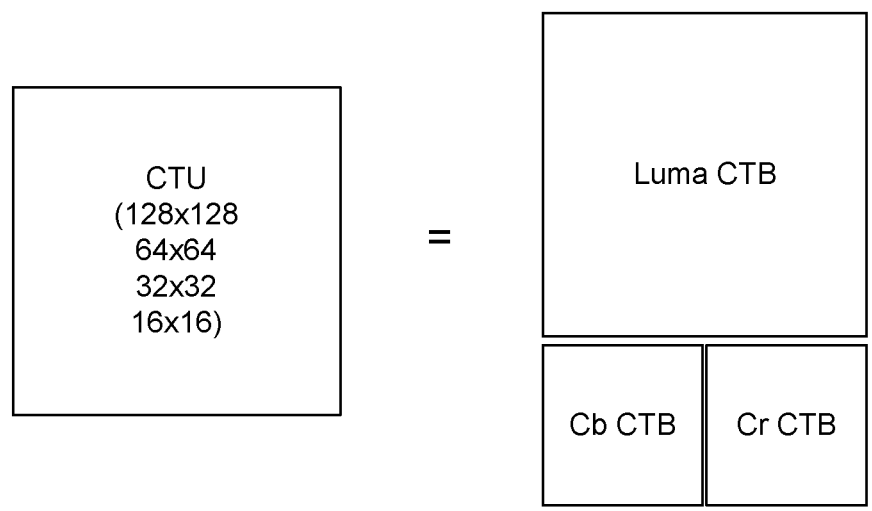

As shown in FIG. 4A, video encoder 20 (or more specifically partition unit 45) generates an encoded representation of a frame by first partitioning the frame into a set of coding tree units (CTUs). A video frame may include an integer number of CTUs ordered consecutively in a raster scan order from left to right and from top to bottom. Each CTU is a largest logical coding unit and the width and height of the CTU are signaled by the video encoder 20 in a sequence parameter set, such that all the CTUs in a video sequence have the same size being one of 128×128, 64×64, 32×32, and 16×16. But it should be noted that the present application is not necessarily limited to a particular size. As shown in FIG. 4B, each CTU may comprise one coding tree block (CTB) of luma samples, two corresponding coding tree blocks of chroma samples, and syntax elements used to code the samples of the coding tree blocks. The syntax elements describe properties of different types of units of a coded block of pixels and how the video sequence can be reconstructed at the video decoder 30, including inter or intra prediction, intra prediction mode, motion vectors, and other parameters. In monochrome pictures or pictures having three separate color planes, a CTU may comprise a single coding tree block and syntax elements used to code the samples of the coding tree block. A coding tree block may be an N×N block of samples.

Figure 4C:
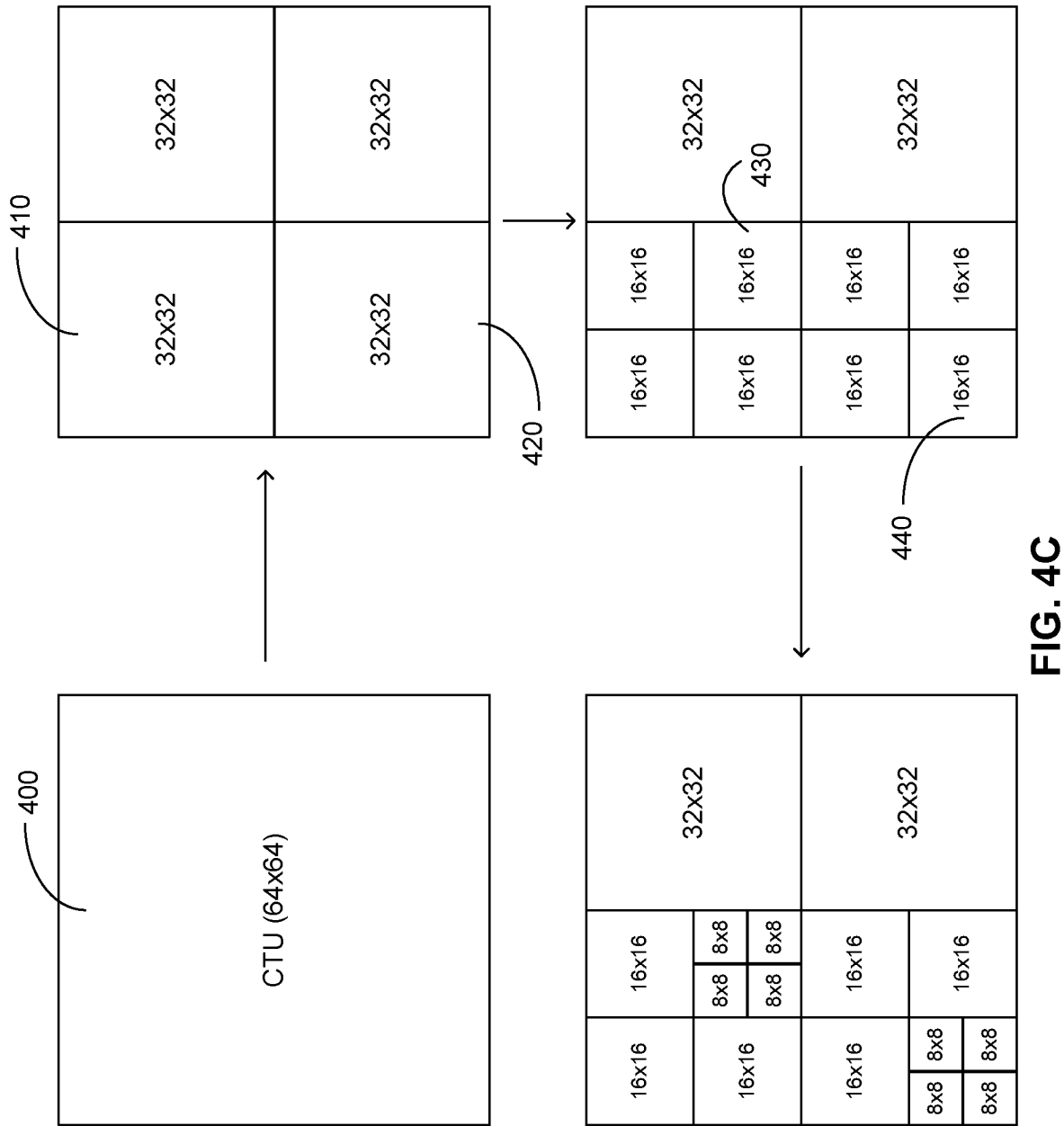
Figure 4D:
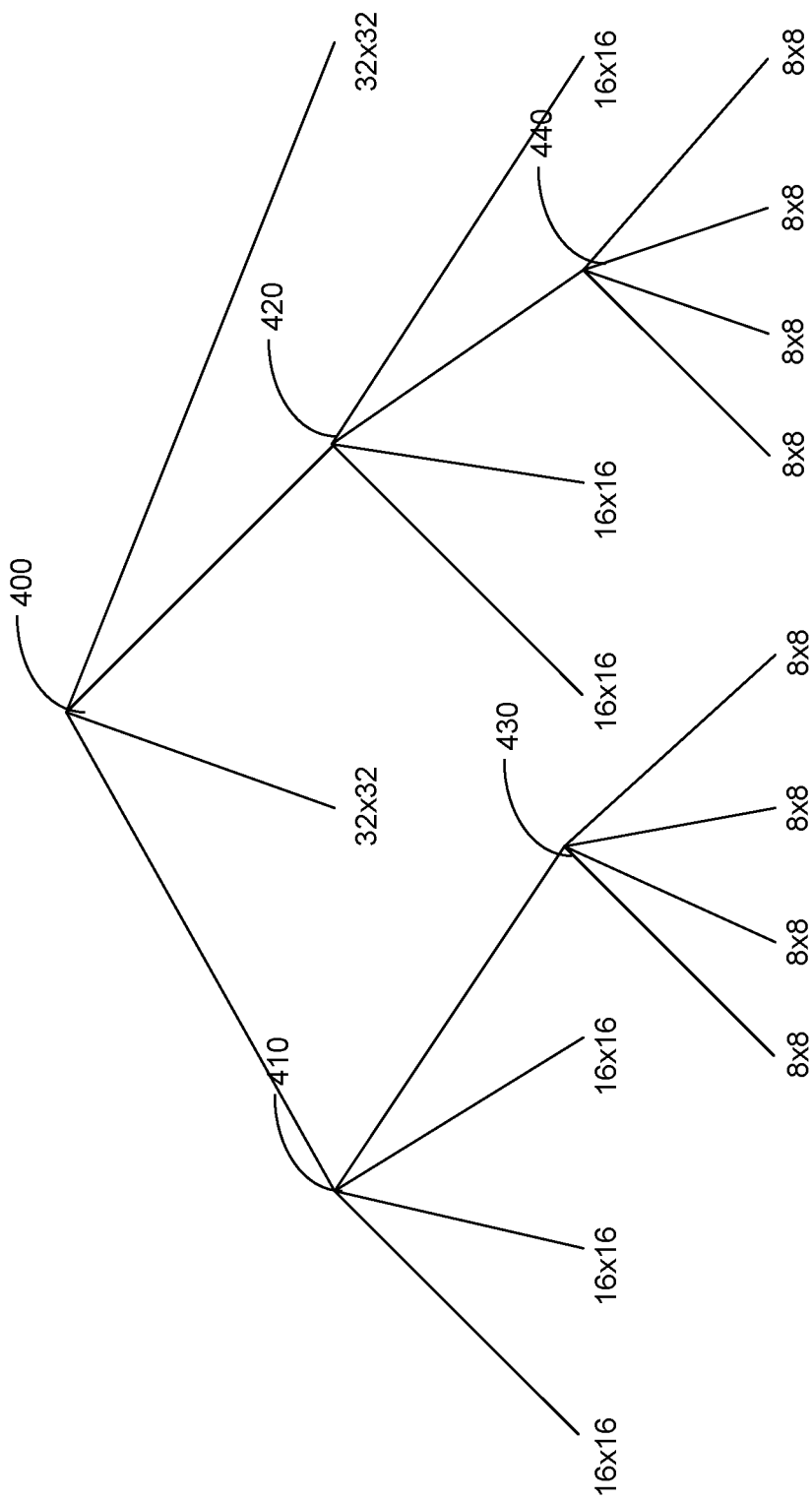

To achieve a better performance, video encoder 20 may recursively perform tree partitioning such as binary-tree partitioning, quad-tree partitioning or a combination of both on the coding tree blocks of the CTU and divide the CTU into smaller coding units (CUs). As depicted in FIG. 4C, the 64×64 CTU 400 is first divided into four smaller CU, each having a block size of 32×32. Among the four smaller CUs, CU 410 and CU 420 are each divided into four CUs of 16×16 by block size. The two 16×16 CUs 430 and 440 are each further divided into four CUs of 8×8 by block size. FIG. 4D depicts a quad-tree data structure illustrating the end result of the partition process of the CTU 400 as depicted in FIG. 4C, each leaf node of the quad-tree corresponding to one CU of a respective size ranging from 32×32 to 8×8. Like the CTU depicted in FIG. 4B, each CU may comprise a coding block (CB) of luma samples and two corresponding coding blocks of chroma samples of a frame of the same size, and syntax elements used to code the samples of the coding blocks. In monochrome pictures or pictures having three separate color planes, a CU may comprise a single coding block and syntax structures used to code the samples of the coding block.

In some implementations, video encoder 20 may further partition a coding block of a CU into one or more M×N prediction blocks (PB). A prediction block is a rectangular (square or non-square) block of samples on which the same prediction, inter or intra, is applied. A prediction unit (PU) of a CU may comprise a prediction block of luma samples, two corresponding prediction blocks of chroma samples, and syntax elements used to predict the prediction blocks. In monochrome pictures or pictures having three separate color planes, a PU may comprise a single prediction block and syntax structures used to predict the prediction block. Video encoder 20 may generate predictive luma, Cb, and Cr blocks for luma, Cb, and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the frame associated with the PU. If video encoder 20 uses inter prediction to generate the predictive blocks of a PU, video encoder 20 may generate the predictive blocks of the PU based on decoded samples of one or more frames other than the frame associated with the PU.

After video encoder 20 generates predictive luma, Cb, and Cr blocks for one or more PUs of a CU, video encoder 20 may generate a luma residual block for the CU by subtracting the CU's predictive luma blocks from its original luma coding block such that each sample in the CU's luma residual block indicates a difference between a luma sample in one of the CU's predictive luma blocks and a corresponding sample in the CU's original luma coding block. Similarly, video encoder 20 may generate a Cb residual block and a Cr residual block for the CU, respectively, such that each sample in the CU's Cb residual block indicates a difference between a Cb sample in one of the CU's predictive Cb blocks and a corresponding sample in the CU's original Cb coding block and each sample in the CU's Cr residual block may indicate a difference between a Cr sample in one of the CU's predictive Cr blocks and a corresponding sample in the CU's original Cr coding block.

Furthermore, as illustrated in FIG. 4C, video encoder 20 may use quad-tree partitioning to decompose the luma, Cb, and Cr residual blocks of a CU into one or more luma, Cb, and Cr transform blocks. A transform block is a rectangular (square or non-square) block of samples on which the same transform is applied. A transform unit (TU) of a CU may comprise a transform block of luma samples, two corresponding transform blocks of chroma samples, and syntax elements used to transform the transform block samples. Thus, each TU of a CU may be associated with a luma transform block, a Cb transform block, and a Cr transform block. In some examples, the luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients. Finally, video encoder 20 may output a bitstream that includes a sequence of bits that forms a representation of coded frames and associated data, which is either saved in storage device 32 or transmitted to destination device 14.

After receiving a bitstream generated by video encoder 20, video decoder 30 may parse the bitstream to obtain syntax elements from the bitstream. Video decoder 30 may reconstruct the frames of the video data based at least in part on the syntax elements obtained from the bitstream. The process of reconstructing the video data is generally reciprocal to the encoding process performed by video encoder 20. For example, video decoder 30 may perform inverse transforms on the coefficient blocks associated with TUs of a current CU to reconstruct residual blocks associated with the TUs of the current CU. Video decoder 30 also reconstructs the coding blocks of the current CU by adding the samples of the predictive blocks for PUs of the current CU to corresponding samples of the transform blocks of the TUs of the current CU. After reconstructing the coding blocks for each CU of a frame, video decoder 30 may reconstruct the frame.

With digital video quality going from high definition, to 4K×2K or even 8K×4K, the amount of vide data to be encoded/decoded grows exponentially. It is a constant problem in terms of how the video data can be encoded/decoded more efficiently while maintaining the image quality of the decoded video data. Different approaches have been adopted by the various video coding standards to solve this problem. For example, it has been found that the translation motion model behaves poorly for motion compensation prediction when there are many kinds of motion, e.g. zoom in/out, rotation, perspective motions and the other irregular motions in the real world. Accordingly, multiple block-based affine motion models have been proposed to increase the accuracy of motion compensation prediction.

FIGS. 5A and 5B are block diagrams illustrating a 4-parameter block-based affine motion model and a 6-parameter block-based affine motion model, respectively, in accordance with some implementations of the present disclosure. As depicted in FIG. 5A, a current block 510 is related to a reference block (not shown in the figure) by two motion vectors, $MV_0(mv_{0x}, mv_{0y})$ at the top-left corner control point of the current block 510 and $MV_1(mv_{1x}, mv_{1y})$ at the top-right corner control point of the current block 510. Assuming that the width of the current block 510 is W, the motion vector $MV(mv_x, mv_y)$ at any location (x, y) within the current block 510 is defined by a linear affine motion model as follows:

$$\begin{cases} mv_x = \dfrac{mv_{1x} - mv_{0x}}{W} x + \dfrac{mv_{1y} - mv_{0y}}{W} y + mv_{0x} \\ mv_y = \dfrac{mv_{1y} - mv_{0y}}{W} x + \dfrac{mv_{1x} - mv_{0x}}{W} y + mv_{0y} \end{cases} \quad (1)$$

Similarly, as depicted in FIG. 5B, another current block 520 is related to a reference block (not shown in the figure) by three motion vectors, $MV_0(mv_{0x}, mv_{0y})$ at the top-left corner control point of the current block 520, $MV_1(mv_{1x}, mv_{1y})$ at the top-right corner control point of the current block 520, and $MV_2(mv_{2x}, mv_{2y})$ at the bottom-left corner control point of the current block 520. Assuming that the width and height of the current block 520 are W and H, respectively, the motion vector $MV(mv_x, mv_y)$ at any location (x, y) within the current block 520 is defined by a linear affine motion model as follows:

$$\begin{cases} mv_x = \dfrac{mv_{1x} - mv_{0x}}{W} x + \dfrac{mv_{2x} - mv_{0x}}{H} y + mv_{0x} \\ mv_y = \dfrac{mv_{1y} - mv_{0y}}{W} x + \dfrac{mv_{2y} - mv_{0y}}{H} y + mv_{0y} \end{cases} \quad (2)$$

Figure 5D:
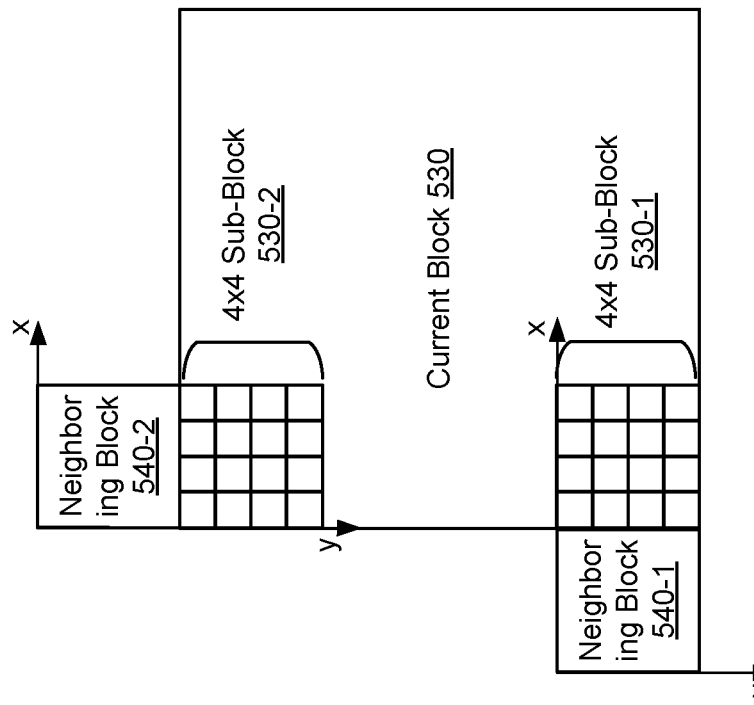
FIG. 5D is a block diagram illustrating spatial relationship between a sub-block within an inter-predicted current block and a neighboring affine block in accordance with some implementations of the present disclosure.
Figure 5C:
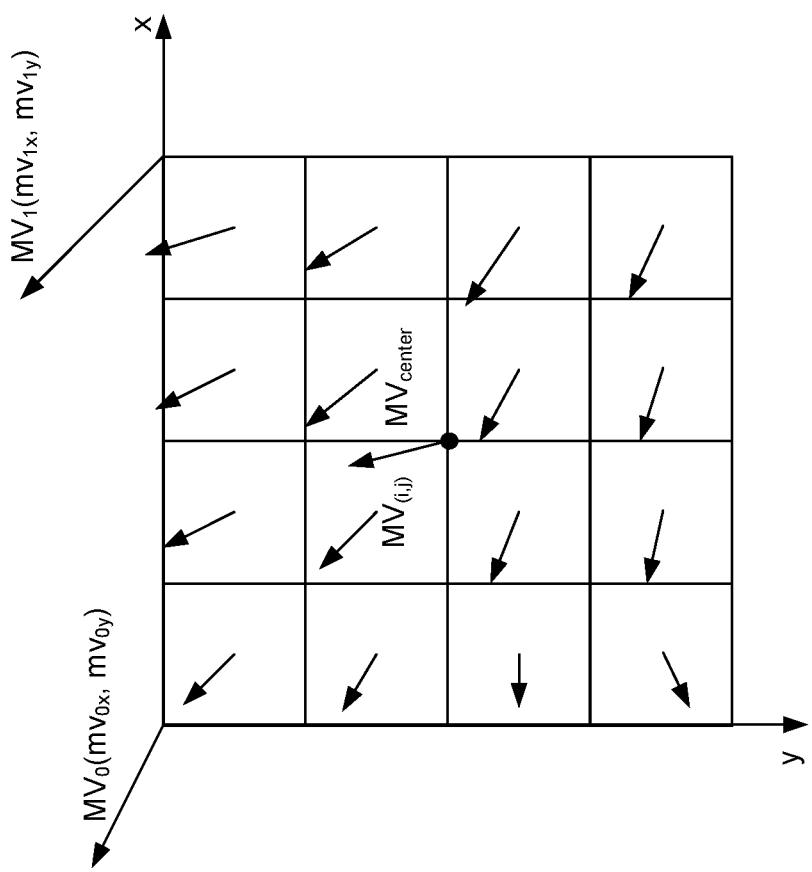
FIG. 5C is a block diagram illustrating exemplary motion vector distribution of a 4×4 sub-block derived from a 4-parameter affine motion model in accordance with some implementations of the present disclosure.

FIG. 5C is a block diagram illustrating exemplary motion vector distribution of a 4×4 sub-block of samples derived from the 4-parameter block-based affine motion model described above in accordance with some implementations of the present disclosure. By applying the coordinate of each sample within the 4×4 sub-block to the equation (1) above, a motion vector prediction $MV_{(i,j)}$ is calculated at that sample (i, j) as indicated by a corresponding arrow sign. The motion vectors based on the affine motion models can be used by video encoder 20 in an affine inter-prediction mode for sub-block based affine motion compensation to improve the accuracy of the predicted pixel values. After the sub-block based affine motion compensation is performed, the luma prediction sample can be further refined by adding a difference derived by the optical flow equation.

First, it is assumed that, after the sub-block-based affine motion compensation is performed, the luma prediction at sample (i, j) is I(i, j). The spatial gradients $g_x(i,j)$ and $g_y(i,j)$ of the sub-block luma prediction are calculated at each sample location within the sub-block using a 3-tap filter [−1, 0, 1] as follows:

$$\begin{cases} g_x(i, j) = I(i+1, j) - I(i-1, j) \\ g_y(i, j) = I(i, j+1) - I(i, j-1) \end{cases} \quad (3)$$

Note that the sub-block luma prediction is extended by one pixel on each side for the gradient calculation. To reduce the memory bandwidth and complexity, the pixels on the extended borders of the sub-block are copied from the nearest integer pixel position in the reference picture to avoid additional interpolation for padding region.

According to the optical flow equation, the luma prediction refinement $\Delta I(i,j)$ is an inner product of the pixel value gradient vector and the motion vector difference as a pixel value difference, which is defined as follows:

$$\Delta I(i,j) = g_x(i,j) * \Delta m v_x(i,j) + g_y(i,j) * \Delta m v_y(i,j) \quad (4)$$

where the $\Delta mv(i,j)$ is a motion vector difference between the motion vector computed for a sample location (i,j), denoted by mv(i,j), and the motion vector of the sub-block to which pixel (i,j). The motion vector difference $\Delta mv(i,j)$ can be calculated using one of the 4-parameter affine motion model and the 6-parameter affine motion model or other affine models known to those skilled in the art.

For illustrative purposes, the 4-parameter affine motion model is used below. As depicted in FIG. 5C, assume that i and j are the horizontal-x and vertical-y offsets from the pixel location to the top-left point of the current sub-block, the motion vector mv(i,j) of any sample within the current sub-block can be derived by the following equations:

$$\begin{cases} mv_x(i, j) = c*i + d*j + mv_{0x} \\ mv_y(i, j) = e*i + f*j + mv_{0y} \end{cases} \quad (5)$$

As described above, for the 4-parameter affine motion model, the parameters of the equations above are:

$$\begin{cases} c = f = \dfrac{mv_{1x} - mv_{0x}}{W} \\ e = -d = \dfrac{mv_{1y} - mv_{0y}}{W} \end{cases} \quad (6)$$

For 6-parameter affine model, the parameters of the equations above are:

$$\begin{cases} c = \dfrac{mv_{1x} - mv_{0x}}{W} \\ d = \dfrac{mv_{2x} - mv_{0x}}{H} \\ e = \dfrac{mv_{1y} - mv_{0y}}{W} \\ f = \dfrac{mv_{2y} - mv_{0y}}{H} \end{cases} \quad (7)$$

where $(mv_{0x}, mv_{0y})$, $(mv_{1x}, mv_{1y})$, $(mv_{2x}, mv_{2y})$ are the top-left, top-right and bottom-left control point motion vectors of the current block, W and H are the width and height of the current block.

Given the definition of the motion vector mv(i,j) above, the motion vector difference $\Delta mv(i,j)$ of any sample within the current sub-block can be derived by the following equations:

$$\begin{cases} \Delta mv_x(i, j) = mv_x(i, j) - mv_x^{cur} \\ \Delta mv_y(i, j) = mv_y(i, j) - mv_y^{cur} \end{cases} \quad (8)$$

where $(mv_x^{cur}, mv_y^{cur})$ is the motion vector of the current sub-block. By plugging the motion vector difference $\Delta mv(i,j)$ and the spatial gradients $g_x(i,j)$ and $g_y(i,j)$ of the sub-block luma prediction into equation (4), the pixel value difference, i.e., the luma prediction refinement can be determined.

Finally, the luma prediction refinement is added to the luma prediction at sample (i, j), I(i, j), which is derived from the affine model motion prediction and the final prediction I'(i, j), is generated as follow:

$$I'(i,j) = I(i,j) + \Delta I(i,j) \quad (9)$$

In some embodiments, the method described above can be extended to a CU in the non-affine inter-prediction mode especially if the CU has a neighboring block that is inter-predicted according to the affine mode. In this case, the affine model control point motion vectors used for the current block can be derived from the affine model control point motion vectors of a selected neighboring block. In some implementations, the current block is to directly use the affine model of the selected neighboring block to derive the affine motion for each sample in the current block.

FIG. 5D is a block diagram illustrating spatial relationship between a sub-block within an inter-predicted current block 530 and a neighboring affine block in accordance with some implementations of the present disclosure. Assuming that the neighboring block 540-1 is inter-predicted according to an affine motion model and it is located to the left side of the current block 530, it is possible that a sub-block (e.g., the 4×4 sub-block 530-1) within the current block 530 near the neighboring block 540-1 may be able to benefit from the optical flow-based prediction refinement as described above because of their spatial proximity (e.g., the 4×4 sub-block 530-1 may be part of the same object as the neighboring block 540-1). Similarly, if the neighboring block 540-2 is an inter-predicted block according to an affine motion model, the 4×4 sub-block 530-2 within the current block 530 that is located below the neighboring block 540-2 can also benefit from the optical flow-based prediction refinement as described above because of their spatial proximity. Note that the 4×4 sub-block 530-2 may also be able to benefit from a neighboring block located to the left of the 4×4 sub-block 530-2 (not shown in the figure) if the neighboring block is also an inter-predicted block according to an affine motion model for the same reason above. In such case, it is a design choice to choose which neighboring block for performing prediction refinement to the sub-block 530-2.

Because the current block is inter-predicted according to a non-affine mode, it may not have the affine model control point motion vectors like the ones depicted in FIG. 5A (4-parameter affine model) and FIG. 5B (6-parameter affine model). It is necessary to determine a corresponding set of affine model control point motion vectors for the current block (more specifically a particular sub-block). For example, assuming x and y represent the horizontal and vertical offset from a pixel location in the current block to the top-left point of a selected neighboring affine block and $(mv_{0x}, mv_{0y})$, $(mv_{1x}, mv_{1y})$, $(mv_{2x}, mv_{2y})$ are the top-left, top-right and bottom-left control point motion vectors of the selected neighboring affine block, the motion vector of the pixel location can be derived using equation (1) for 4-parameter affine model or equation (2) for 6-parameter affine model. Alternatively, the motion vectors in the neighboring block may be used directly to derive the affine motion vector for each pixel in the current block. In either case, the final prediction I' is generated according to the following equation $$I'(i,j)=I(i,j)+w*\Delta I(i,j) \quad (10)$$

where w is a weighting factor to adjust the impact of $\Delta I(i, j)$ on the non-affine mode luma prediction at sample $(i, j)$, $I(i, j)$. In one example, w is set equal to 1. In another example, w is set equal to be less than 1, e.g., 0.5. Note that this weighting factor can be modified from one CU to another CU or remain the same for the entire picture. Of course, the value of the weighting factor should be signaled to video decoder 30 in the video bitstream.

FIG. 6 is a flowchart illustrating a process of refining a prediction for a sub-block within an inter-predicted current block using a neighboring affine block in accordance with some implementations of the present disclosure. Note that this process may be employed by a video encoder or a video decoder. For illustrative purposes, the process will be described as part of a video decoding process by video decoder 30.

First, video decoder 30 identifies a pixel within an inter-predicted current block (610), the pixel having a first inter-predicted pixel value. This step is part of a process of decoding a CU that is surrounded by one or more neighboring blocks that have been decoded according to an affine inter-prediction model. Both the current block and the neighboring blocks correspond to the same reference picture and the neighboring blocks have already been reconstructed. The current block is to be reconstructed according to a non-affine inter-prediction model. But as described above in connection with FIG. 5D, it is possible to perform prediction refinement to a sub-block within the current block if the sub-block is very close to one of the neighboring blocks (e.g., the 4×4 sub-blocks 540-1 or 540-2). It should be noted that, like the employment of a weighting factor as described above, the expansion of the neighboring block's affine model is typically limited to those sub-blocks at the boundary of the current block because the result from prediction refinement may be more unreliable for those inner pixels of the current block. In other words, at least one pixel value within the inter-predicted current block is not updated by any neighboring affine block. Note that the 4×4 sub-block size is only for illustrative purposes and it can be bigger than 4×4.

Video decoder 30 then determines a motion vector difference for the pixel based on a set of affine parameters of the neighboring affine block according to, e.g., equation (8) above (630). In some implementations, $(mv_x^{cur}, mv_y^{cur})$ is the motion vector of the sub-block within the current block. For example, the current block may have a block-based motion vector. In some other implementations, $(mv_x^{cur}, mv_y^{cur})$ is the motion vector of the neighboring block. In this case, the sub-block within the current block is treated as an extension of the neighboring block.

Next, video decoder 30 determines a pixel value difference for the pixel according to the motion vector difference according to, e.g., equation (4) above (650). As noted above, the process of determining a pixel value difference for the pixel requires that a pixel value gradient vector for the pixel is determined (650-1) by, e.g., applying a 3-tap filter to pixel values at the pixel and its neighboring pixels within the inter-predicted current block, and then an inner product of the pixel value gradient vector and the motion vector difference is calculated as the pixel value difference (650-3).

After calculating the pixel value difference, video decoder 30 then updates the first inter-predicted pixel value with the pixel value difference as a second inter-predicted pixel value according to, e.g., equation (10) above (670). In some implementations, a weighting factor is applied to the pixel value difference (670-1) and the weighted pixel value difference is added to the first inter-predicted pixel value as the second inter-predicted pixel value (670-3).

As noted above, the prediction refinement based on optical flow described herein is based on an assumption that the sub-block within the current block is close to a neighboring affine block. Therefore, if the current block has a large size (e.g., 32×32), the prediction refinement based on optical flow is applied to only those pixels inside the current block that are close to the selected neighboring affine block where the affine model is derived. In one example, the prediction refinement based on optical flow is applied only to those sub-blocks (e.g. 4×4) of the current block that are next to the selected neighboring block where the affine model is derived.

In some implementations, the current block may have multiple neighboring affine blocks. In order to refine some portions of the current block, there should be a predefined order of searching the neighboring affine blocks. For example, the first available neighboring affine block is selected to derive the affine model for applying the prediction refinement based on optical flow to the current block (more a sub-block within the current block). Accordingly, the prediction refinement based on optical flow may be applied to sub-blocks located at different sections (e.g. upper section, lower section, left section, right section, etc.) in the current block with different affine models derived from their corresponding neighboring blocks.

In one example, the current block is divided into 4×4 sub-blocks, the prediction refinement based on optical flow is only applied to the sub-blocks located at the upper and left section of the current block. For each sub-block located at the upper section within the current block, the above neighboring affine block is selected to derive the affine model for applying the prediction refinement based on optical flow to this sub-block. Otherwise, no prediction refinement based on optical flow is applied to this sub-block. For a sub-block located at the left section within the current block, its left neighboring affine block is selected to derive the affine model for applying the prediction refinement based on optical flow to this sub-block. Otherwise, no prediction refinement based on optical flow is applied to this sub-block. As a special case, for a sub-block located at the top-left section in the current block, the prediction refinement based on optical flow could be selectively applied using the affine model from either the left neighboring affine block or the above neighbouring affine block. In yet another example, for a sub-block located at the top-left section in the current block, the prediction refinement based on optical flow could be jointly applied using the affine model from both the left neighboring affine block and the above neighboring affine block in a predefined order.

In some implementations, the prediction refinement based on optical flow using the affine model of the neighboring affine blocks can be applied to a uni-predictive block or a bi-predictive block.

In some implementations, for pixels and/or sub-blocks located at different sections (e.g. upper section, lower section, left section, right section, etc.) in the current block, the prediction refinement based on optical flow is only applied to a subset of sections in the current block. For example, for a block coded as affine merge mode, the prediction refinement based on optical flow is only applied to the sub-blocks located at the upper and left section of the current block. In one example, for a block coded as affine merge mode, the prediction refinement based on optical flow is applied to the sub-blocks located at either the upper or left section of the current block depending on whether above of the left neighboring affine block is selected for affine merge. In yet another example, for a block coded as affine merge mode, the prediction refinement based on optical flow is disabled.

In some implementations, when $\Delta mv_x(i,j)$ and/or $\Delta mv_y(i,j)$ at the pixels or sub-blocks are larger than a predefined threshold, it is deemed that the continuity between the sub-block and the neighboring affine blocks may have been destroyed or does not exist. In this case, the prediction refinement based on optical flow is also disabled.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the implementations described in the present application. A computer program product may include a computer-readable medium.

The terminology used in the description of the implementations herein is for the purpose of describing particular implementations only and is not intended to limit the scope of claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, elements, and/or components, but do not preclude the presence or addition of one or more other features, elements, components, and/or groups thereof.

It will also be understood that, although the terms first, second, etc. may be used herein to describe various elements, these elements should not be limited by these terms. These terms are only used to distinguish one element from another. For example, a first electrode could be termed a second electrode, and, similarly, a second electrode could be termed a first electrode, without departing from the scope of the implementations. The first electrode and the second electrode are both electrodes, but they are not the same electrode.

The description of the present application has been presented for purposes of illustration and description, and is not intended to be exhaustive or limited to the invention in the form disclosed. Many modifications, variations, and alternative implementations will be apparent to those of ordinary skill in the art having the benefit of the teachings presented in the foregoing descriptions and the associated drawings. The embodiment was chosen and described in order to best explain the principles of the invention, the practical application, and to enable others skilled in the art to understand the invention for various implementations and to best utilize the underlying principles and various implementations with various modifications as are suited to the particular use contemplated. Therefore, it is to be understood that the scope of claims is not to be limited to the specific examples of the implementations disclosed and that modifications and other implementations are intended to be included within the scope of the appended claims.

What is claimed is:

1. A method of updating an inter-predicted current block using a neighboring affine block, the method comprising:
   identifying a pixel within the inter-predicted current block, wherein the inter-predicted current block comprises an inter-predicted non-affine block, and the pixel having a first inter-predicted pixel value;
   determining a motion vector difference between a motion vector of the pixel calculated using a set of affine parameters of the neighboring affine block and a motion vector of the inter-predicted current block, wherein the pixel is located within a sub-block of the inter-predicted current block and the sub-block is next to the neighboring affine block;
   determining a pixel value difference for the pixel according to the motion vector difference; and
   updating the first inter-predicted pixel value with the pixel value difference as a second inter-predicted pixel value.

2. The method of claim 1, wherein the determining a pixel value difference for the pixel according to the motion vector difference further comprises:
   determining a pixel value gradient vector for the pixel; and
   calculating an inner product of the pixel value gradient vector and the motion vector difference as the pixel value difference.

3. The method of claim 2, wherein the pixel value gradient vector for the pixel is estimated by applying a 3-tap filter to pixel values at the pixel and its neighboring pixels within the inter-predicted current block.

4. The method of claim 1, wherein the sub-block is located at an upper section of the inter-predicted current block and the neighboring affine block is located above the inter-predicted current block.

5. The method of claim 1, wherein the sub-block is located at a left section of the inter-predicted current block and the neighboring affine block is located left to the inter-predicted current block.

6. The method of claim 1, wherein the inter-predicted current block and the neighboring affine block have the same reference picture.

7. The method of claim 1, wherein the updating the first inter-predicted pixel value with the pixel value difference as a second inter-predicted pixel value further comprises:

weighting the pixel value difference by a weighting factor; and adding the weighted pixel value difference to the first inter-predicted pixel value as the second inter-predicted pixel value.

8. The method of claim 7, wherein the weighting factor is less than 1.

9. The method of claim 1, wherein the neighboring affine block is a first one of a plurality of neighboring blocks of the inter-predicted current block having an affine mode according to a predefined order.

10. The method of claim 1, wherein the inter-predicted current block is a bi-predictive block.

11. The method of claim 1, wherein the inter-predicted current block is a uni-predictive block.

12. The method of claim 1, wherein at least one pixel value within the inter-predicted current block is not updated by any neighboring affine block.

13. An electronic apparatus comprising:

one or more processing units;

memory coupled to the one or more processing units; and a plurality of programs stored in the memory that, when executed by the one or more processing units, cause the electronic apparatus to perform acts comprising:

identifying a pixel within the inter-predicted current block, wherein the inter-predicted current block comprises an inter-predicted non-affine block, and the pixel having a first inter-predicted pixel value;

determining a motion vector difference between a motion vector of the pixel calculated using a set of affine parameters of the neighboring affine block and a motion vector of the inter-predicted current block, wherein the pixel is located within a sub-block of the inter-predicted current block and the sub-block is next to the neighboring affine block;

determining a pixel value difference for the pixel according to the motion vector difference; and updating the first inter-predicted pixel value with the pixel value difference as a second inter-predicted pixel value.

14. The electronic apparatus of claim 13, wherein the determining a pixel value difference for the pixel according to the motion vector difference further comprises:

determining a pixel value gradient vector for the pixel; and calculating an inner product of the pixel value gradient vector and the motion vector difference as the pixel value difference.

15. The electronic apparatus of claim 14, wherein the pixel value gradient vector for the pixel is estimated by applying a 3-tap filter to pixel values at the pixel and its neighboring pixels within the inter-predicted current block.

16. The electronic apparatus of claim 13, wherein the sub-block is located at an upper section of the inter-predicted current block and the neighboring affine block is located above the inter-predicted current block, or wherein the sub-block is located at a left section of the inter-predicted current block and the neighboring affine block is located left to the inter-predicted current block.

17. The electronic apparatus of claim 13, wherein the updating the first inter-predicted pixel value with the pixel value difference as a second inter-predicted pixel value further comprises:

weighting the pixel value difference by a weighting factor; and adding the weighted pixel value difference to the first inter-predicted pixel value as the second inter-predicted pixel value.

18. A non-transitory computer readable storage medium storing a plurality of programs for execution by an electronic apparatus having one or more processing units, wherein the plurality of programs, when executed by the one or more processing units, cause the electronic apparatus to perform acts comprising:

identifying a pixel within the inter-predicted current block, wherein the inter-predicted current block comprises an inter-predicted non-affine block, and the pixel having a first inter-predicted pixel value;

determining a motion vector difference between a motion vector of the pixel calculated using a set of affine parameters of the neighboring affine block and a motion vector of the inter-predicted current block, wherein the pixel is located within a sub-block of the inter-predicted current block and the sub-block is next to the neighboring affine block;

determining a pixel value difference for the pixel according to the motion vector difference; and updating the first inter-predicted pixel value with the pixel value difference as a second inter-predicted pixel value.

* * * * *